June 20, 1939. W. LISTER 2,162,851
ROTARY INTERNAL COMBUSTION ENGINE
Original Filed July 3, 1934 8 Sheets-Sheet 4

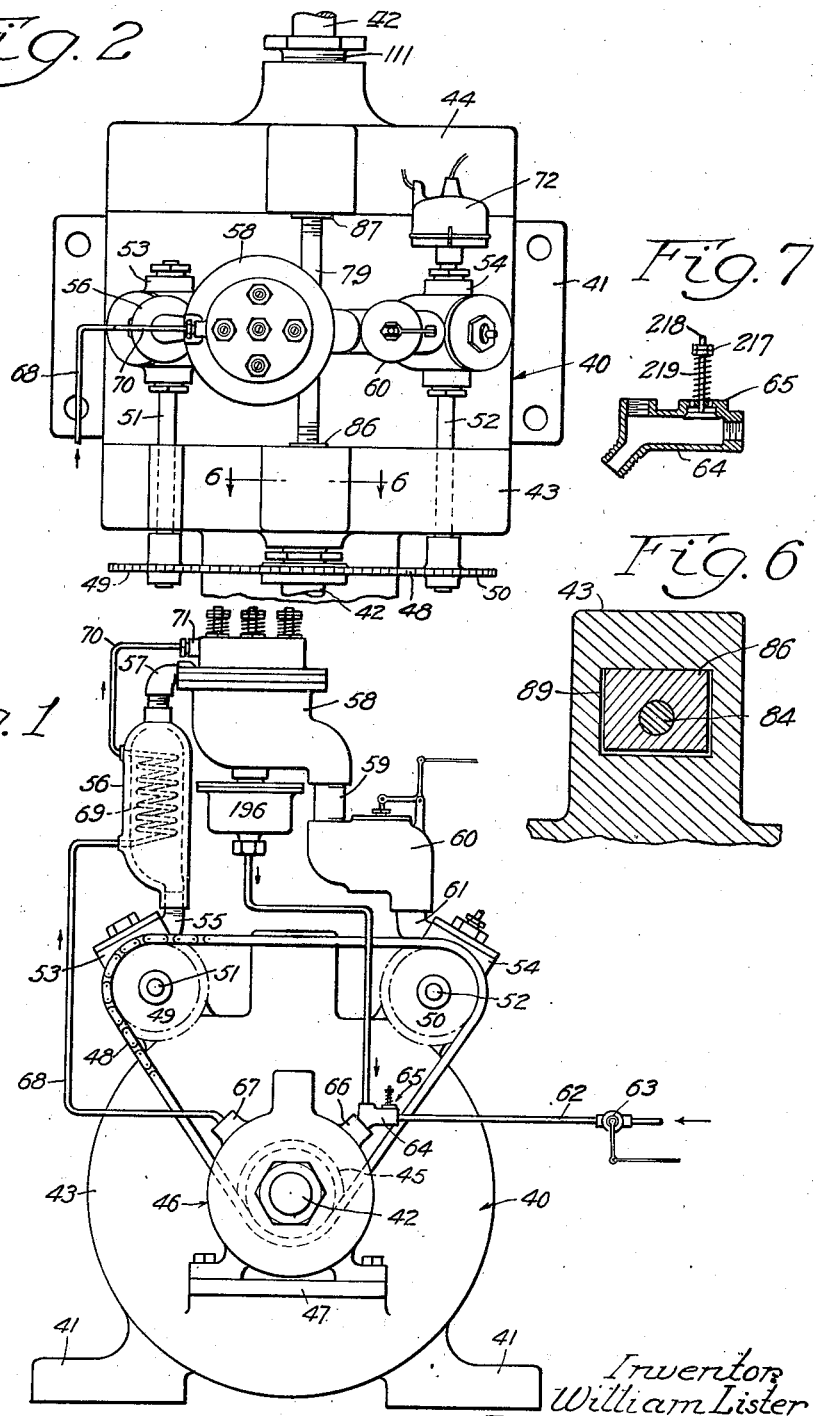

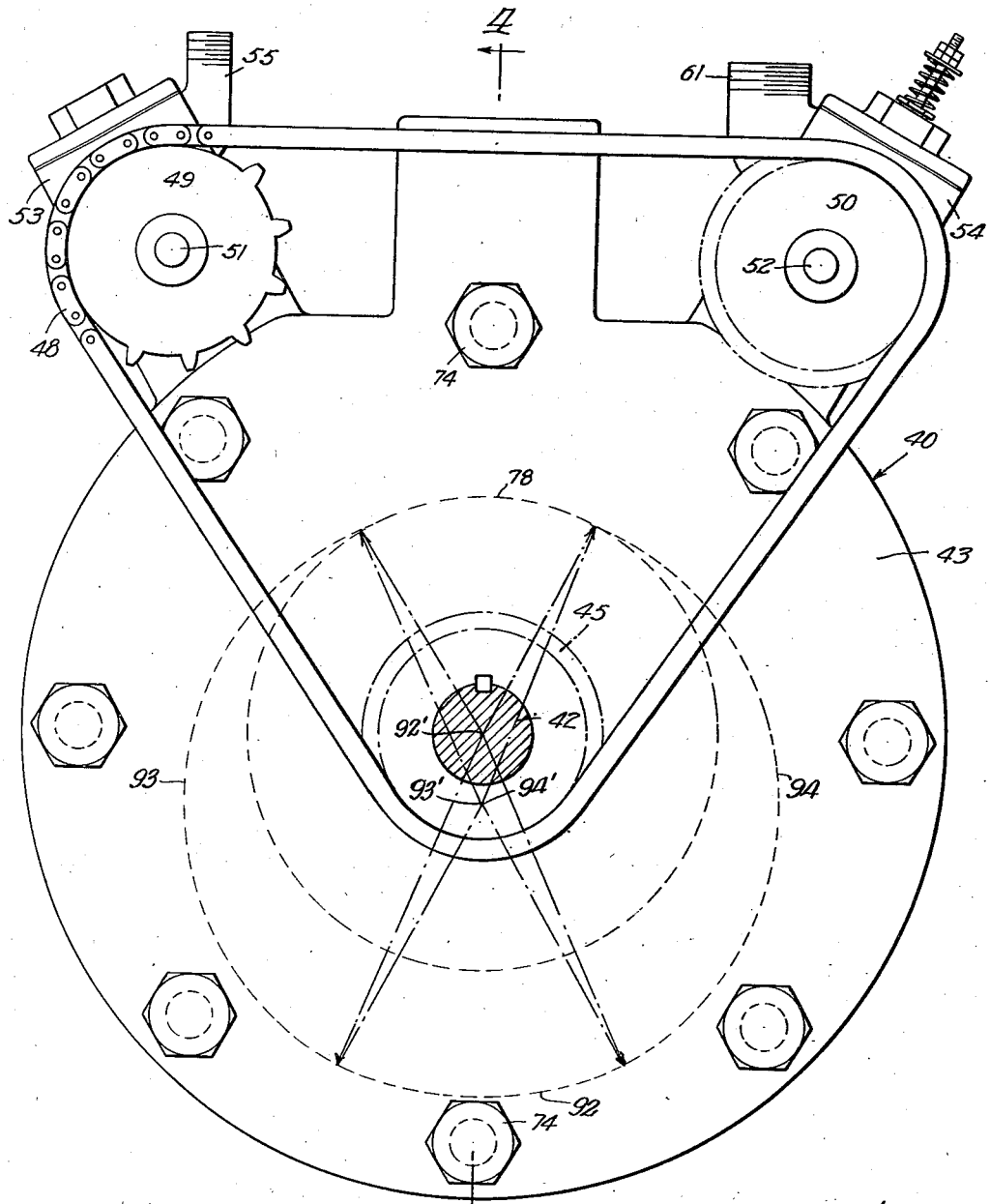

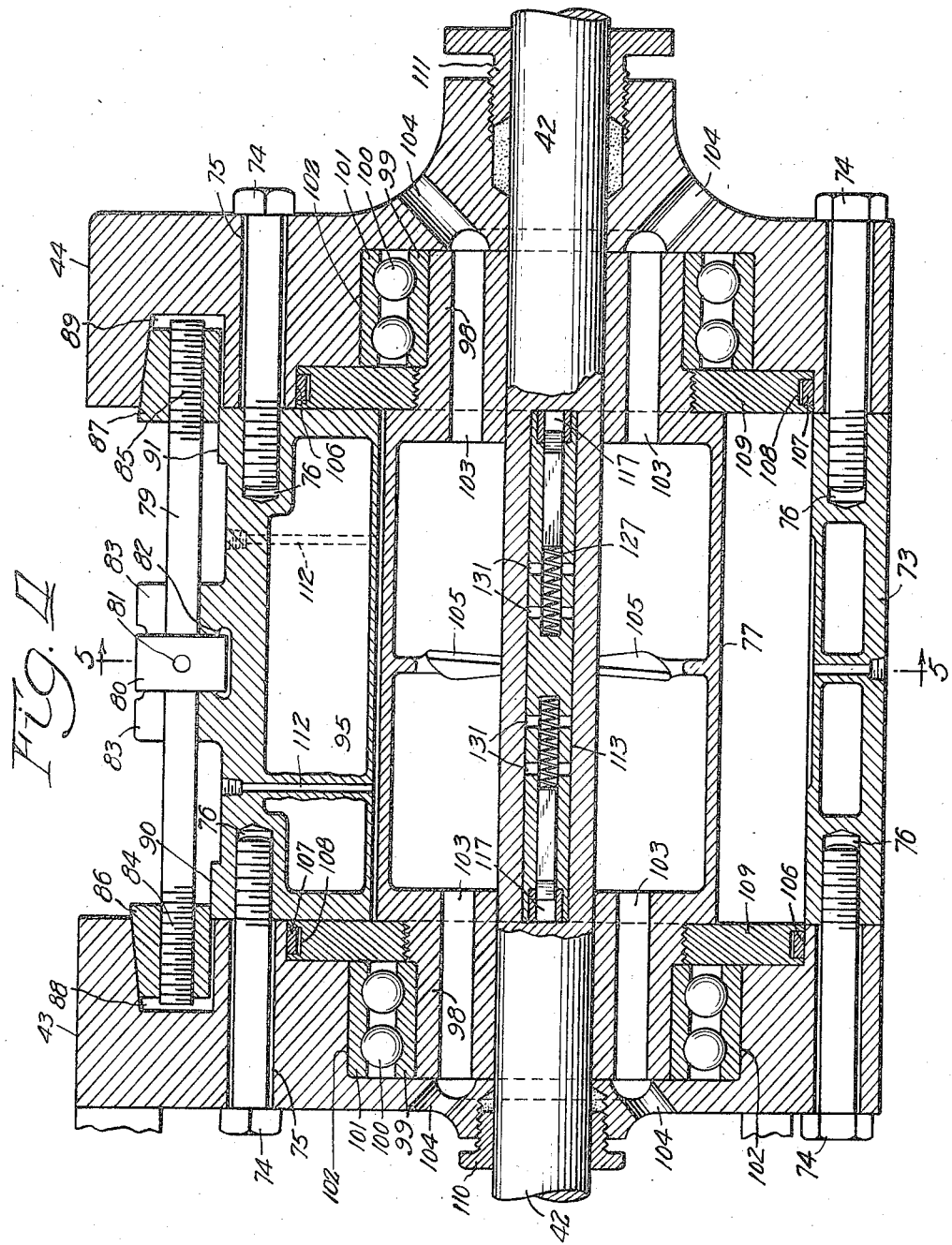

Inventor,
William Lister

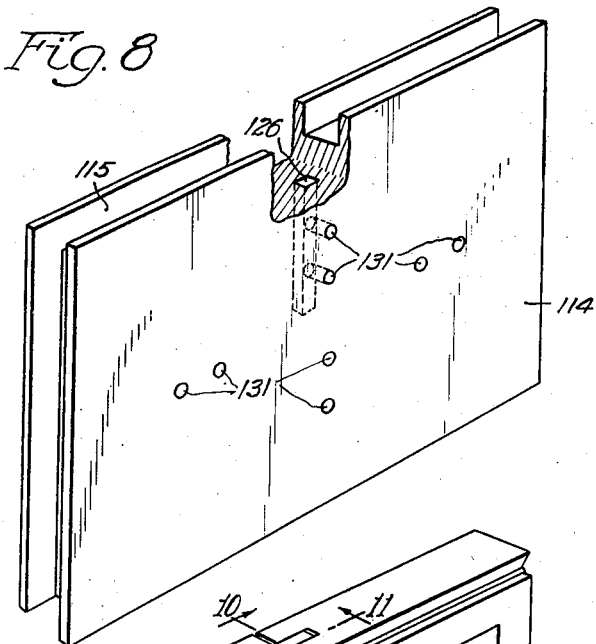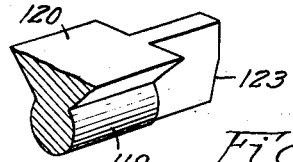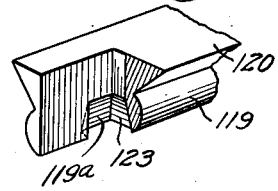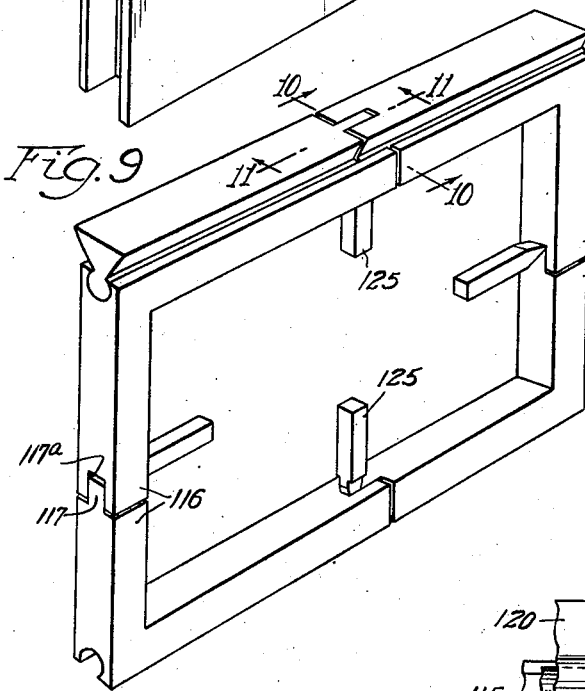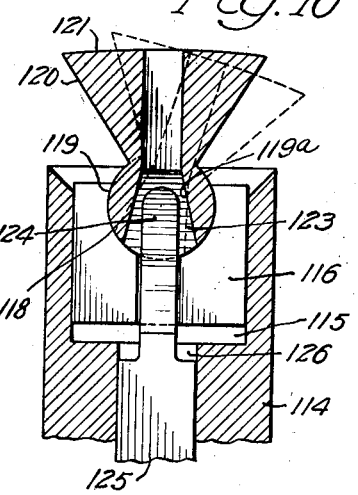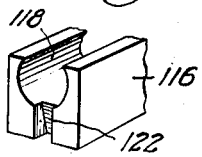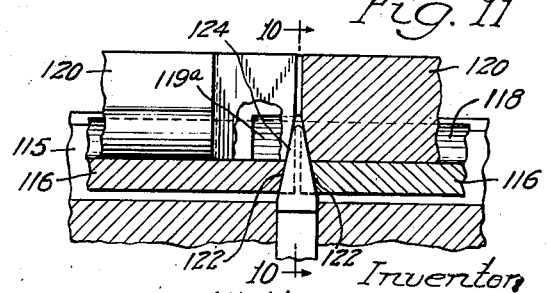

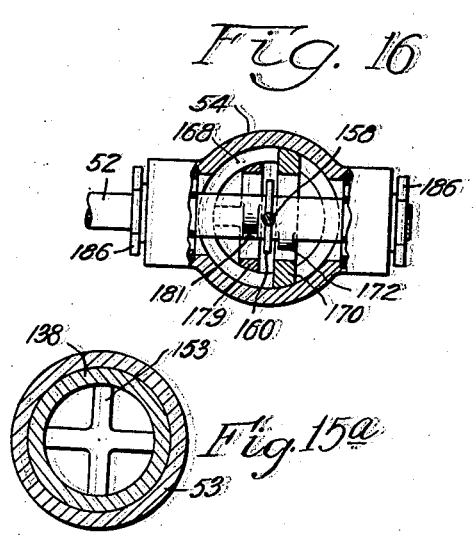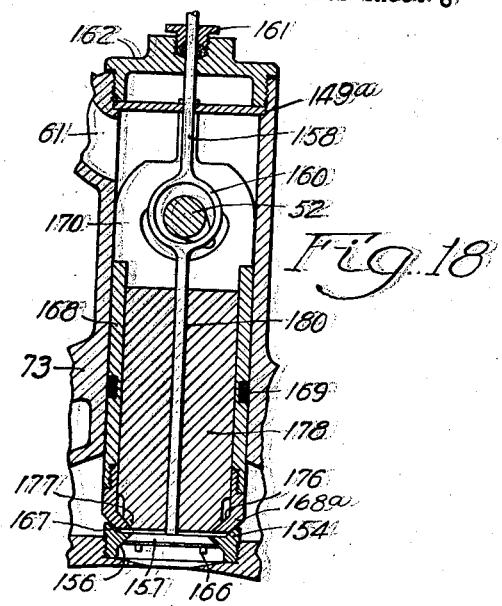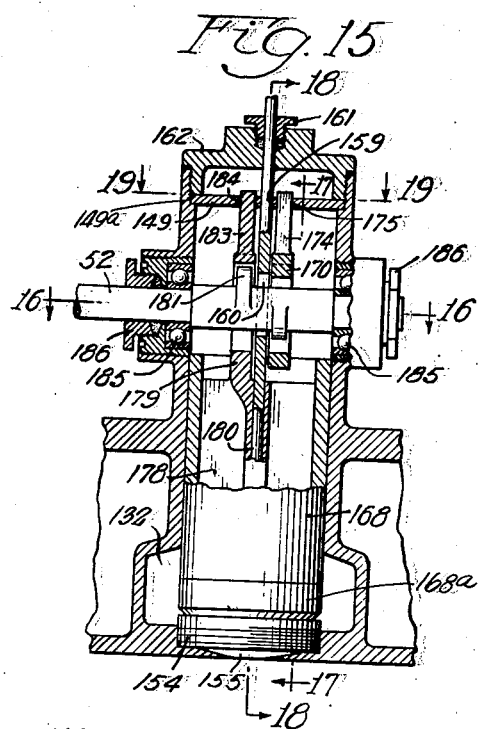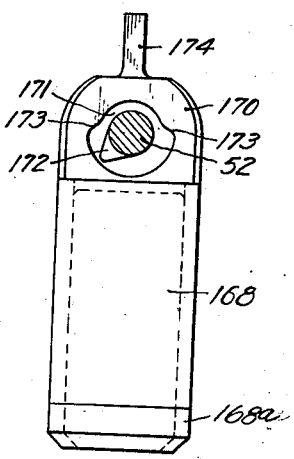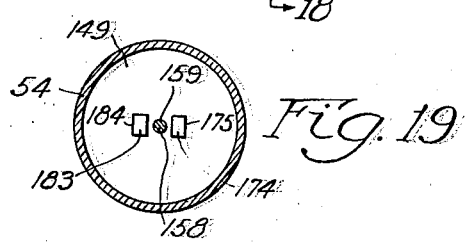

June 20, 1939.  W. LISTER  2,162,851
ROTARY INTERNAL COMBUSTION ENGINE
Original Filed July 3, 1934   8 Sheets-Sheet 7
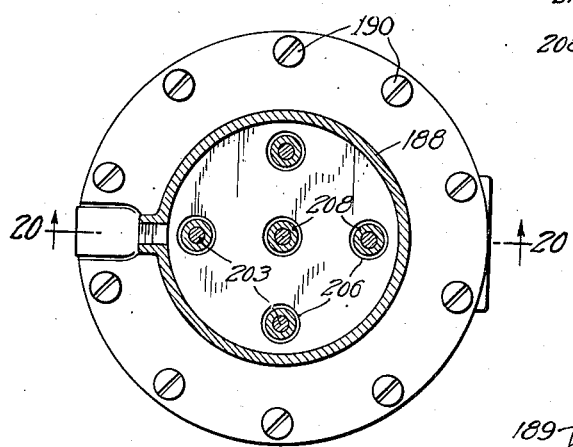
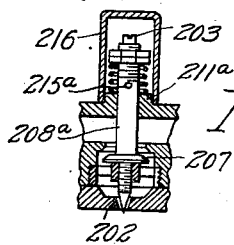
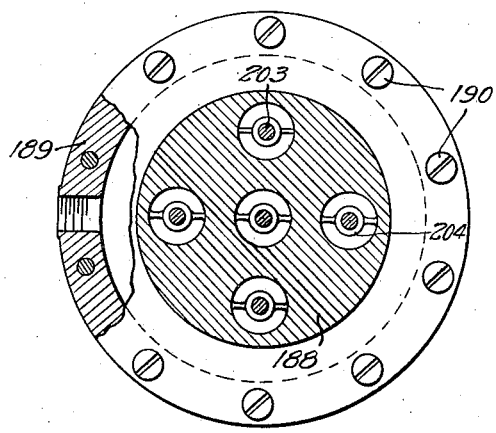
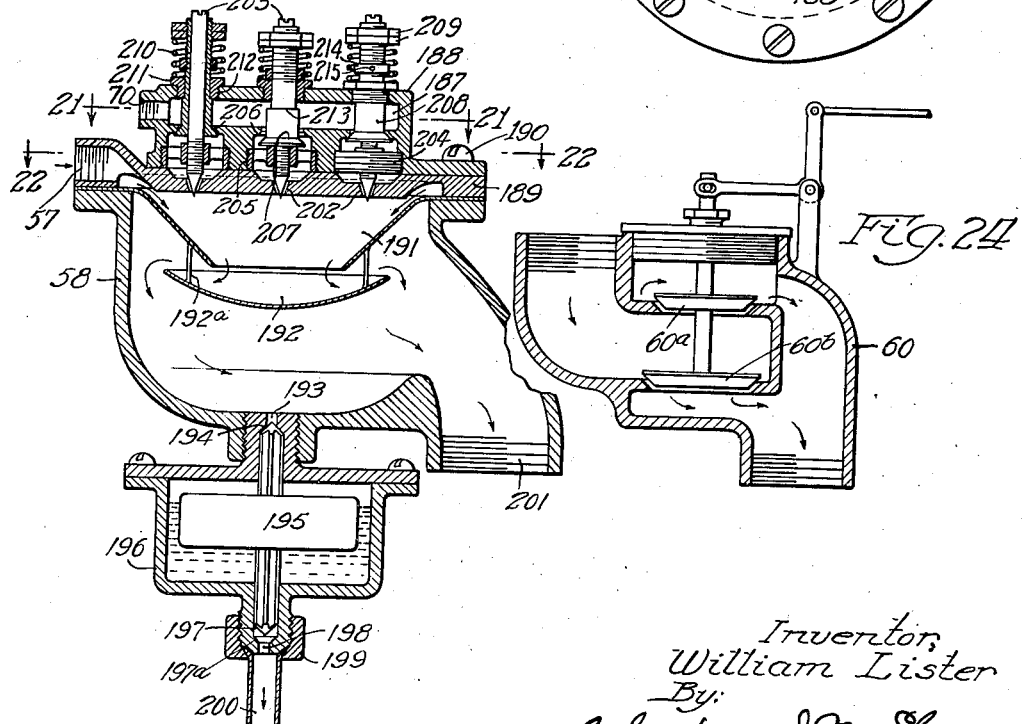
Inventor,
William Lister
By:
John Howard McElroy,
his Atty.

June 20, 1939.  W. LISTER  2,162,851
ROTARY INTERNAL COMBUSTION ENGINE
Original Filed July 3, 1934   8 Sheets-Sheet 8

Inventor
William Lister
By John Howard McElroy,
his Atty

Patented June 20, 1939

2,162,851

UNITED STATES PATENT OFFICE 2,162,851

ROTARY INTERNAL COMBUSTION ENGINE

William Lister, Chicago, Ill.

Application July 3, 1934, Serial No. 733,572
Renewed July 20, 1938

20 Claims. (Cl. 123—16)

My invention is concerned with combustion engines, and a novel method of and apparatus for operating the same.

It is concerned primarily with a rotary engine which, instead of merely furnishing power to operate a compressor, actually operates as a compressor by alternating the delivery to it of charges of mixture and of air to be compressed, and which compressed air, in the complete embodiment of my invention, is used as an essential ingredient for subsequent charges of mixture, it being forced to a vaporizer, where it is charged with vapors of fuel oil before it returns to the engine as the mixture.

It is also concerned with novel apparatus for vaporizing heavy fuel oils for use in combustion engines.

It is also concerned with a novel structure by which the interior of the rotor of a rotary engine may be kept cooled despite the heat generated by the combustion of the fuel.

It is also concerned with a novel rotor construction by which leaking past the blade is prevented, whether it is used for an engine, motor, pump or compressor.

It is also concerned with a novel system including a combustion engine, a fuel pump, and vaporizing apparatus whereby when the amount of fuel oil is cut down, the amount of air is automatically increased so as to thin the mixture more readily than would be possible if the air supply were left unchanged.

It is finally concerned with further novel combinations of elements, as will be hereinafter fully described and specifically pointed out in the claims.

To illustrate my invention, I annex hereto eight sheets of drawings, in which the same reference characters are used to designate identical parts in all the figures, of which, Fig. 1 is a side elevation of a rotary engine and its associated elements included in the novel system;

Fig. 2 is a top plan view of the same, but with the pump omitted;

Fig. 3 is a side elevation of the engine, but on a larger scale;

Fig. 4 is a central vertical section on the line 4—4 of Fig. 3;

Fig. 6 (Sheet 1) is a detail in section on the line 6—6 of Fig. 2, but on a larger scale;

Fig. 7 is a detail of a check valve associated with the fuel pump and seen on a smaller scale in Fig. 1;

Fig. 8 is a perspective view of the central portion of the rotor blade;

Fig. 9 is a perspective view of a portion of the sealing apparatus used in connection with the same;

Fig. 10 is a detail in section, on an enlarged scale, as seen on the line 10—10 of Fig. 9;

Fig. 11 is a detail as seen in section on the line 11—11 of Fig. 9, but on a larger scale;

Figs. 12 and 13 are perspective views of detached portions of the adjacent ends of the swinging contact blades;

Fig. 14 is a similar view of the end of one of the L-shaped members carrying the swinging contact blades;

Fig. 15 is a sectional view as seen on the line 15—15 of Fig. 5;

Fig. 15a is a sectional view on line 15a—15a of Fig. 5;

Fig. 16 is a sectional view as seen on the line 16—16 of Fig. 15;

Fig. 17 is a side elevation of one of the valves shown in Fig. 15, but removed from the casing and with its actuating shaft shown in cross section;

Figure 5:
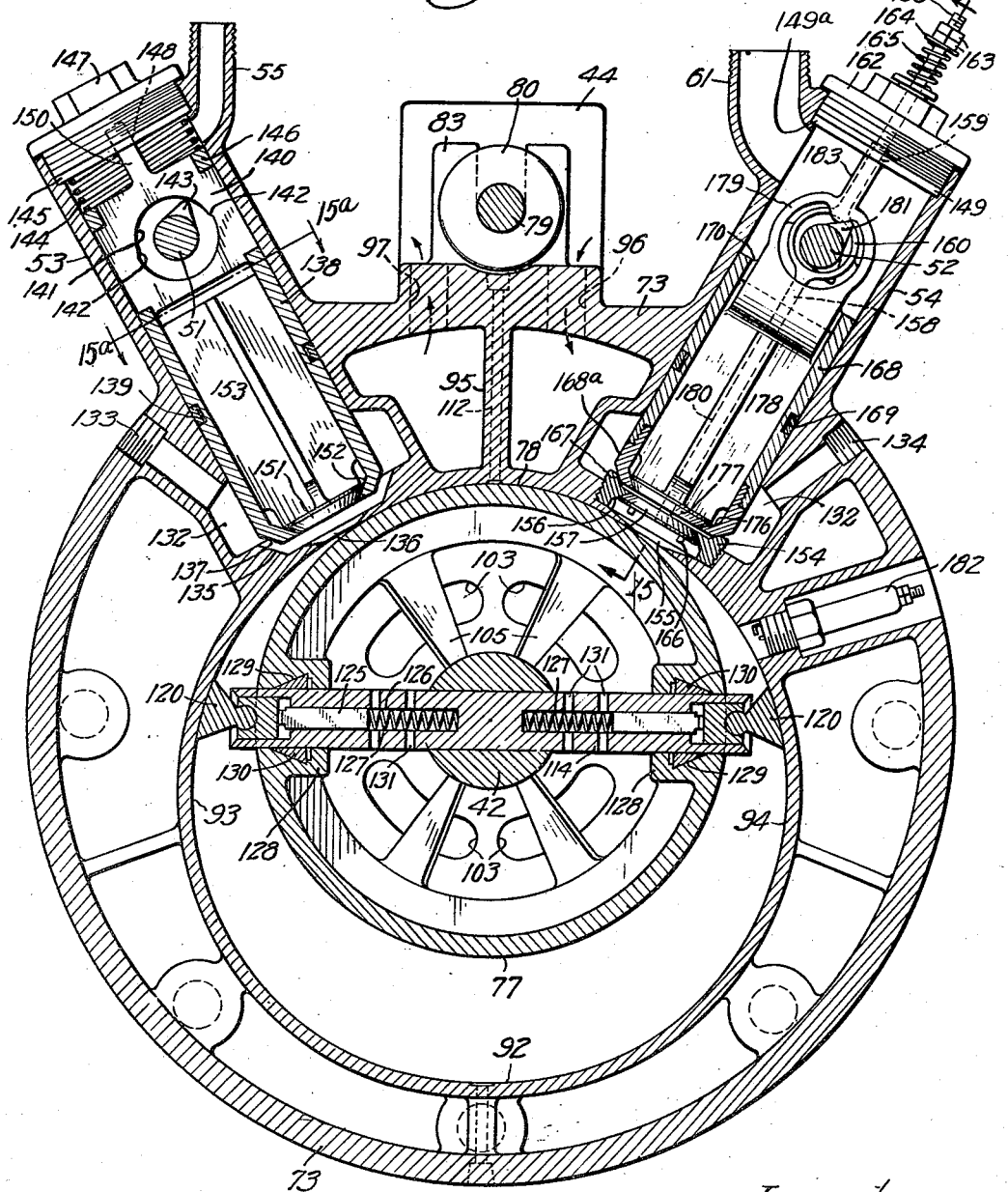
Fig. 5 is a vertical section on the line 5—5 of Fig. 4.
Figure 25:
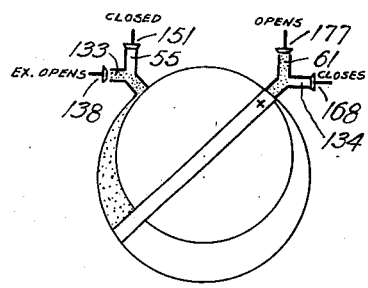

Figs. 18 and 19 are sectional views as seen on the lines 18—18 and 19—19, respectively, of Fig. 15;

Fig. 20 is a central vertical section through the volatilizer, as seen on the line 20—20 of Fig. 21;

Figs. 21 and 22 are horizontal sections through the volatilizer as seen on the lines 21—21 and 22—22, respectively, of Fig. 20;

Fig. 23 is a detail showing another form of one of the volatilizer valves;

Fig. 24 is a central vertical section, on an enlarged scale, through the balanced controlling valve, seen in side elevation in Fig. 1; and Figs. 25 to 32, inclusive, are diagrammatic views illustrating the various positions of the rotor blade and the associated valves throughout a complete cycle of its movement.

Referring first to Figs. 1 and 2, 40 is the rotary engine carried by the heavy base 41 having the rotor shaft 42, seen in Figs. 3 and 4, mounted in suitable bearings in the heads 43 and 44 on the cylinder. A sprocket wheel 45 secured on the shaft 42 between the head 43 and the fuel pump 46 mounted on the bracket 47 projecting from the head 43 drives the sprocket chain 48, which drives the sprocket wheels 49 and 50 on the cam shafts 51 and 52 journaled in the head 43 and in the valve casings 53 and 54, to be hereinafter more fully described. The valve casing 53 has a short compressor or outlet pipe 55 connected to the heating chamber 56, through which the compressed air passes, and which passes therefrom through the elbow 57 to the vaporizer 58, where the fuel oil is vaporized by the combined action of heat and compressed air, and thence passes through the short pipe 59 to the balanced controlling valve 60, which in turn is connected to the elbow 61, which furnishes the mixture inlet to the valve casing 54. The fuel oil is drawn from its supply through the pipe 62 having the manually-operated controlling valve 63 therein, and passes through the union 64 containing the check valve 65 to the inlet 66 of the rotary pump 46, by which it is forced from the outlet 67 through the pipe 68 to the heating coil 69 in the chamber 56, thence through the continuation pipe 70 to the inlet port 71 of the vaporizer 58. The ignition timer 72 may be secured on the valve shaft 52, as shown in Fig. 2.

The general layout of the system having been indicated, reference is now had to Figs. 3 to 14, inclusive, for the details of the engine cylinder and its co-operating rotor and blade members. The cylinder-shell 73 is adjustably secured between the heads 43 and 44 by the screw bolts 74 passed through the larger apertures 75 therein and threaded into the recesses 76 in the ends of the shell. The cylindrical surface 77 of the rotor must fit tightly against the adjacent portion 78 of the interior of the shell, which is on the arc of a circle having the same diameter as the periphery of the rotor, and to take up the wear and insure proper adjustment initially, I provide the adjusting means shown in Figs. 4, 5 and 6, where it will be seen that a rod 79 has secured on its center a disk 80 provided with two oppositely disposed apertures 81 therein as seen in Fig. 5 for the insertion of tools, the rod 79 and the disk 80 being journaled, as it were, in the recess 82 formed in the top of the shell between the lugs 83 projecting upwardly from the center of the top of the shell 73. The ends of the rod 79 have right and left hand threads 84 and 85 which co-operate with the oppositely directed wedge blocks 86 and 87 having the inclined upper surfaces co-operating with the correspondingly inclined upper surfaces of the recesses 88 and 89 formed in the heads 43 and 44, respectively as seen in Fig. 4. The under sides of the wedges 86 and 87 co-operate with the plane flat horizontal surfaces 90 and 91 formed on the top of the shell 73. From this construction it will be apparent that when wear occurs, a tool may be inserted in one of the apertures 81 of the disk 80, and the rod 79 turned sufficiently so as to force the wedges 86 and 87 outwardly enough to lift the heads 43 and 44 relative to the shell 73 sufficiently to make the desired close contact between the periphery 77 of the rotor and the adjacent curved portion 78 of the inner periphery of the shell.

The shell 73 has the inner periphery forming the operating surface preferably bored out so as to form the top portion 78 as the arc of a circle smaller than the opposed arc 92 of a circle of larger diameter, and in between these arcs are the side arcs 93 and 94 of circles of a still different diameter, the combined effect of these circles being to produce a generally cylindrical surface which somewhat resembles that of a Limacon curve, but which need not be an exact one, as the radial movement under spring pressure of the blade members 120 (see Fig. 5) in contact therewith obviates the necessity of so accurate a curve as the Limacon, which theoretically will effectively co-operate with a rigid blade. The space between the arcs 78, 92, 93 and 94 and the outer periphery of the shell 73 is hollow, as shown, and a vertical web 95 extends the length of the shell, and on one side, I place one or more vertical apertures 96, and on the other side corresponding apertures 97, both indicated in dotted lines in Fig. 5, and in operation, cooling air or water may be introduced in any desired manner through the apertures 96 and pass clockwise in the hollow space around to the apertures 97.

The rotor has the general shape of a cylinder, with its ends 98 reduced as shown, and preferably provided with the ball races 99, in which the anti-friction balls 100 roll and co-operate with the ball races 101 secured in the circular recesses 102 provided therefor in the heads 43 and 44. Apertures 103 (best seen in Fig. 5) are provided in the hubs 98, and register with apertures 104 formed in the heads 43 and 44, and in the hollow of the rotor, preferably at its center, I provide a plurality of fan blades 105, which, as the engine is operating, serve to pump air in through the apertures 104 at one end of the engine, through the apertures 103 past the fan blades, and out through the apertures 103 and 104 at the other end, thus supplying a constant current of cooling air through the rotor, which has an extremely beneficial effect in keeping down the temperature of the interior of the rotor, where certain springs to be hereinafter described are located. The recesses 102 in the heads 43 and 44 are enlarged at their inner ends, and at said inner ends furnish annular sealing surfaces 106, with which co-operate expanding packing rings 107 acting like piston rings located in the annular recesses 108 formed in the peripheries of the disks 109 threaded on the hubs of the rotor and located between the inner ends of the ball races and the ends of the shell 73. As the sealing action is the result of the packing rings 107 co-operating with the sealing surfaces 106, the fit of the disks 109 against the adjacent surfaces of the heads need not be close, as indicated in the drawings, but considerable clearance may be employed to reduce friction. The rotor shaft 42 is preferably provided with the customary packed bearings 110 and 111, as shown in Fig. 4. With the construction shown, and with the packing rings 107 operating as perfectly as they do in the customary reciprocating engine, it will be obvious that no leakage through the bearings of the rotor can occur. The web 95 previously mentioned may be provided with the holes 112 therethrough to furnish means for supplying lubricating oil to the rotor.

Referring now more particularly to Figs. 4 to 14, the blade for the rotor is preferably built up as follows: The customary elongated aperture 113 extending the length of the rotor is formed in its shaft 42, and through this slides the body 114 of the blade, which preferably consists of the rectangular body, solid except as hereinafter mentioned, and provided at its sides and ends with the rectangular channel 115 designed to receive the four L-shaped expansion members 116, which are rectangular in cross section and adapted to fit in the channels 115, as clearly shown in Figs. 10 and 11. The co-operating ends of the expansion members 116 are formed with tongues 117 co-operating with grooves 117ª, as will be readily apparent and as shown in Fig. 9, and the outer horizontal edges thereof co-operating with the inner periphery of the cylinder through the contact blade members 122 having the truncated circular groove 118 therein, in which are placed the correspondingly curved inner edges 119 of said contact blade members 120, which are preferably angular, as shown, and have their contact surfaces 121 curved on the arc of a circle which approximates as nearly as possible the varying arcs 78, 92, 93 and 94, with which they co-operate. The adjacent tongued and grooved ends of said members 116 are recessed and beveled, as shown at 122, and the adjacent ends of the contact members 120 are likewise recessed and beveled, as seen at 123, Figs. 10, 12 and 13, the wedge-grooved portions co-operating with the wedge-shaped ends 124 having adjacent portions of the grooves in the curved inner edges widened as indicated at 119a, as seen in Fig. 10, so as to permit the swinging of the members 121 without their being interfered with by the wedge-shaped ends 124 of the spring-pressed slides 125 mounted in the four bearing apertures 126 formed in the member 114 to receive them. Between the bottoms of these apertures 126 and the inner ends of the slides 125, I interpose the helically-coiled expanding springs 127, which, as will be obvious, have the function of forcing the slides 125 out as far as possible, with the result that the horizontal slides serve to keep the contact members 121 in spring-pressed engagement with the inner periphery of the shell, and the vertical slides serve to keep the ends or what may be termed the radial edges of the members 116 in contact with the inner faces of the disks 109.

As a further seal to prevent leakage from the explosion chamber to the hollow interior of the rotor, I provide on its interior the inwardly directed flanges 128 (see Fig. 5), which have their inner surfaces formed with the smooth triangular recesses 129 extending the length of the blade, and in these recesses I place wedge-shaped sealing members 130, likewise extending the length of the blade and complementary to the shape of the recesses 129, with the result that, as the engine is operated, the centrifugal action on the sealing members 130 serves to throw them outward and press them against the adjoining surfaces of the member 114, and thereby securely seal it against the passage of air or burnt mixture to the interior of the rotor. As a further means of keeping the springs 127 at a harmless temperature despite the heat of combustion, I provide in the members 114 apertures 131 opening into the bearing apertures 126, where the springs are located, so that they may receive the benefit of the cooling air circulating through the interior of the rotor due to the action of the fan blades 105.

Figure 26:
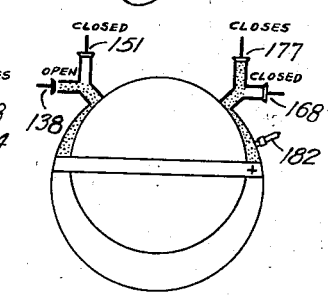
Figure 27:
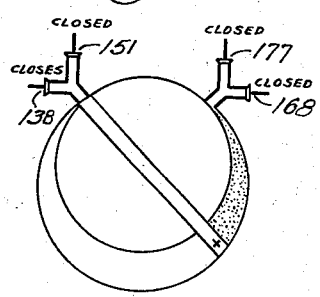
Figure 28:
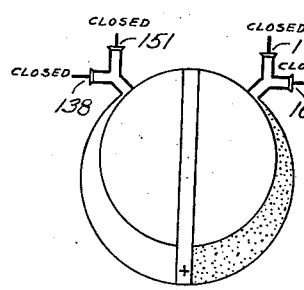
Figure 29:
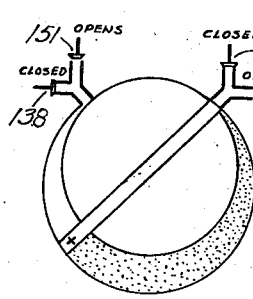

The valve casings 53 and 54 are, as seen, cylindrical in their interior except toward the bottom, where they have the annular enlargement 132, and the casing 53 has the outlet 133 therein, adapted to be connected to whatever device through which the exhaust is discharged. The similar enlargement for the casing 54 has the inlet 134 therein, through which fresh air to be compressed is received, and it may be piped thereto from any desired source. In the bottom of the enlargement 132 of the valve casing 53 is the beveled valve seat 135, and beneath this is the outlet opening 136 into the space between the rotor and the interior of the cylinder. Cooperating with the valve seat 135 is the correspondingly beveled end 137 of the tubular valve 138, which slides freely in the cylindrical valve casing and is kept pressure-tight therein by the piston ring 139 located about midway of its length. At its upper end the valve 138 has a web 140 containing the generally circular aperture 141 having the opposed cam offsets 142, with which the cam lug 143 on the shaft 51 co-operates to lift the valve off of its seat when the products of combustion are to be discharged through the outlets 136 and 133, this action beginning when the blade is in the position shown in Fig. 31 and continuing through the position in Figs. 32, 25 and 26, and ceasing when the blade reaches the position shown in Fig. 27. The valve is held seated during half the rotation of the cam shaft 51 by the helically-coiled expanding spring 144 held between the guide disk 145 and the annulus 146 formed at the outer end of the web 140. The disk 145 is held in place by the threaded cap 147, and has therein a rectangular aperture 148, its position being indicated by the dotted lines, and is similar in its shape to the two corresponding apertures 175 and 184 seen in Fig. 19 in the guide disk 149 employed in the valve casing 54. The web 140 has the extension 150 which has the same cross section as the aperture 148 to prevent the valve 138 from turning and thus getting out of register with the cam lug 143. Inside of the cylindrical valve 138 is another valve 151 co-operating with the corresponding beveled valve seat 152 formed on the inner surface of the bottom of the valve 138. The stem 153 of the valve 151 is in the form of a cross in cross section, (see Fig. 15a) with the ribs thereof co-operating with the interior of the valve 138 to keep it in proper alignment with the seat with which it co-operates. It may be explained that in operation, the compressed air furnished by the engine extends, as before noted, through the valve casing 53, the heating chamber 56, the volatilizer 58, the valve 60, and through the inlet 61 to the interior of the valve casing 54. As a result of this pressure, the valve 151 is normally held closed, and when the valve 138 is seated, during the time that the cam lug 143 is inoperative and while the blade is passing through the positions shown in Figs. 27 to 30, inclusive, the outlet 136 is closed against the passage therethrough of any air being compressed by the blade, as seen in Figs. 26 to 28, inclusive, until the pressure of the air being forced to the outlet 136 is greater than the pressure in the valve casing 53, etc., when the valve 151 will be raised and the air being brought to a pressure above that in the casing 53 will life the valve 151 and increase the pressure beyond it to that extent.

Referring now to the contents of the valve casing 54, as seen in Figs. 5 and 15 to 19, instead of the simple valve seat 135 formed directly in the casting, I preferably employ the removable valve ring 154 threaded into the recess formed in the casting just above the inlet opening 155 to the interior of the cylinder. On the under side of this ring, I form the beveled valve seat 156, with which co-operates the downwardly opening valve 157 secured on the valve stem 158 extending outwardly and centrally through the valve casing 54 and through an aperture 159 in the guide disk 149, it being provided with the loop 160 through which the shaft 52 passes. Its outer end passes through a stuffing box 161 (see Figs. 15 and 18) formed in the cap 162 closing the upper end of the valve casing 54 and threaded in place and clamping the disk 149 securely against an annular shoulder 149a formed in the upper end of the valve casing 54 so as to prevent its rotation. On the threaded outer end of the stem 158, I secure the adjusting nuts 163, which, with the washer 164, serve to tension the helically-coiled expanding spring 165 interposed between the washer and the stuffing box 161. This valve 157 is needed to prevent the pressure of the explosion raising the other two valves to be described from their seats, and when mixture is to be admitted, as hereinafter described, the pressure thereof is sufficient to unseat the valve, and to prevent the possibility of its being opened wide enough so that it would close the inlet 155, I form on its under side a plurality of lugs 166 which engage the annular surface surrounding the aperture 155 and prevent the valve being seated thereon so as to stop the inflow of the air or mixture. When air is admitted through the opening 134, the suction of the blade passing the opening 155 will create a vacuum that overcomes the pressure of the spring 165, which is adjusted rather lightly.

Figure 30:
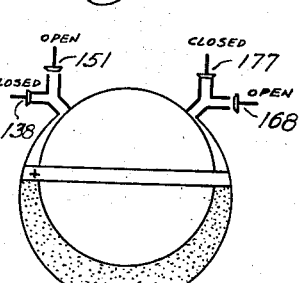
Figure 31:
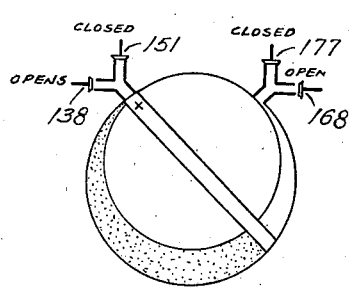
Figure 32:
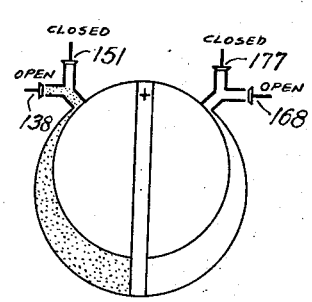

The valve ring 154 will, of course, have its external diameter somewhat less than that of the cylindrical interior of the valve casing 54 so it can be put in place, and it has on its upper or outer surface a second valve seat 167 with which co-operates the beveled surface of the tubular valve 168, which resembles the valve 138 and operates in the same manner, it also being provided with the piston ring 169 located in a suitable channel in the periphery thereof. I may, for convenience of construction, form the valve proper of a separate annulus 168a and thread it in the lower end of the cylinder, as clearly shown in Fig. 5. At the upper end of the sleeve is the web 170 having the generally circular aperture 171 therein (see Fig. 17) to accommodate the cam lug 172 on the shaft 52, which lug co-operates with the cam surfaces 173 to lift the valve 168 off its seat during the rotation of the shaft 52 through substantially one hundred and eighty degrees, the valve 168 being lifted during the period while the air is being drawn in, as indicated in Figs. 30 to 32. Its outer end is provided with the guide piece 174, rectangular in cross section and co-operating with the aperture 175 in the guide disk 149 to keep the web 170 in alignment with the cam lug 172.

The valve 168, like the similar valve 138, has the internal beveled valve seat 176 in its lower end to seat the valve 177, similar to the valve 151, and like it, having the stem 178 cruciform in cross section and guided in the cylindrical interior of the valve 168. Its cam web 179 is offset, as shown in Fig. 15, so that the lower part of the valve stem 158 may slide through a bore 180 formed in the stem 178 concentrically with the valve casing 54. The cam lug 181 on the shaft 52 lifts the valve 177 for the short period required to charge the engine, and a spark plug 182 is suitably located in the shell 73 to fire the charge when admitted, and the valves 168 and 177 are closed by the pressure of the mixture behind them. If desired, the spark plug 182 may be used only for starting the engine, at that time furnished with gasoline, as after it has been running a while, the cylinder at the inlet 155 will be heated sufficiently to ignite each charge as it is admitted. The valve stem 178 has the rectangular extension 183 (see Fig. 19) cooperating with the aperture 184 in the guide disk 149 to keep the cam web 179 in alignment with the cam lug 181.

The operation of the cycle will now be apparent: When the parts are in the position shown in Fig. 25, the valve 177 is lifted during the period that the blade moves to the position of Fig. 26, the valve 168 being seated so that the pressure of the mixture opens the valve 157, thus giving free access of the mixture to the cylinder without the possibility of its escaping through the air inlet 134. At the position shown in Fig. 26, the valve 177 closes, the charge is ignited, and the blade is rotated, by its impulse driving ahead of it the air sucked in through the inlet 134 while the valve 168 was open. After the parts reach the position of Fig. 29, the valve 138 still being closed, the valve 151 will be forced open when the air has been sufficiently compressed and the fresh pressure added to that beyond the valve 151. When the parts reach the position shown in Fig. 31, the valve 138 is lifted, the valve 151 having closed as the piston passes the inlet aperture 135, and the products of combustion are forced out through the outlet 133 until the parts reach the position of Fig. 27, when both valves 138 and 151 are closed, and remain closed until the valve 151 is opened by the pressure of the air compressed by the blade, and which has been drawn in, as previously explained, while the parts pass from the position shown in Fig. 29 to that shown in Fig. 25. This cycle of operations is repeated as long as fuel is supplied to the engine. The shafts 51 and 52 are preferably provided with ball bearings 185, and the stuffing boxes 186, as seen in Fig. 15.

Turning now to Figs. 1, 2, and 20 to 22, the compressed air forced past the valve 151 has been heated by passing through the heated cylinder, and also additionally heated by the pressure to which it has been subjected, and as a consequence the fuel oil passing through the coil 69 in the heated compressed air in the chamber 56 is heated near to the volatilizing point. It passes from the pipe 70 into the shallow circular chamber 187 formed in the cover 188 of the vaporizer 58. A disk 189 is secured between the cover 188 and the body of the vaporizer by the screws 190, which also serve to secure between the disk 189 and the body 58, the annular sheet-metal funnel 191, from which is preferably suspended a concave baffle plate 192 by the rods 192a. The bottom of the body 58 is concaved, as shown, so that any unvaporized oil that may overflow from the baffle plate 192 will necessarily be directed to the outlet 193 having the seat therein for the upper end 194 of the float valve 195 in the float chamber 196. The lower end 197 of the valve co-operates with the seat 197a in the outlet 198 connected by the nut 199 with the pipe 200 leading to the union 64 connected to the inlet of the pump 46, so that any unvaporized oil will flow directly back to the pump and cannot pass through the outlet 201 to the pipe 59, and thence to the engine. The pressure in the vaporizer will keep the float valve seated below and allow the unvaporized fuel oil to enter the chamber 196 until the oil therein rises high enough to lift the valve 195 and allow the accumulated oil to flow back to the pump.

The disk 189 has therein a plurality, preferably five, of needle-valve seats 202, with which co-operate the needle valves 203 threaded through the hubs of the rings 204 screwed into recesses 205 in the bottom of the cover 188. These recesses 205 have reduced circular openings 206 in the web forming the bottom of the chamber 187, these openings having their edges beveled to form seats for the valve 207 formed on the lower ends of the sleeves 208 through which the bodies of the needle valves 203 extend, their upper ends being threaded and having thereon the nuts and set nuts 209 by which the tension of the helically-coiled expanding springs 210 is regulated. The lower ends of these springs engage the tops of the short bearing sleeves 211 threaded into apertures 212 in the cover 188 and registering with the valve seats 206. The sleeves 208 have the shoulders 213 which engage the bottoms of the sleeves 211 when the valves 207 are seated. Secured on the sleeves 208 within the springs 210 are the collars 214 which have the tool holes 215 in their peripheries to insert a tool to hold the sleeve 208 from turning when the nuts 209 are being adjusted to regulate the tension of the springs 210, which are set at different tensions so that the valves 207 will open at different pressures and allow the oil to pass the needle valves in fine streams and meet the compressed air entering the vaporizer and directed downward to the baffle plate 192 by the funnel 191. One of the needle valves will be set to open at a minimum pressure produced by the engine running slowly, and three other valves are set at increasing pressures to open as the speed of the engine increases, thereby increasing the pressure, the fifth one being set at the highest pressure and opening only as an auxiliary valve when the temperature is just under the flash point of the fuel. When a valve 207 is closed, the shoulder 213 seats against the bottom of its sleeve 211 to prevent leakage upward, and when it is wide open, the collar 214 seats against the top of the sleeve 211 for the same purpose. While the construction shown is simple and operative, I may prefer to use the construction shown in Fig. 23, where I omit the shoulder 213 and the collar 214 seating on the bottom and top of the short bearing sleeve 211, and I provide a cap 216 threaded on the bearing 211a which prevents the fuel oil or compressed air from leaking in all positions of the valve and is also free of any friction that would necessarily by present if packing were used to prevent leaking. With this arrangement the tool hole 215a will be placed directly in the sleeve 208a.

The union 64 has the spring-pressed check valve 65, shown in section in Fig. 7, and the nuts 217 cooperating with the threaded upper end of the valve stem 218 enable me to adjust the tension of the spring 219 so as to draw in any desired percentage, preferably 50—50 of air to mix with the oil as it is delivered by the pump 46 to the vaporizer. The action of the heated fuel oil and air delivered by the pump 46 spraying past the needle valves 203 into the compressed air serves thoroughly to vaporize the fuel oil and produce a mixture delivered under a high pressure to the engine, thus utilizing its thermal units in the most efficient manner possible.

To stop or start the engine with the pressure intact and volatilized oil ready to start the engine on compression, I use the balanced valve 60, shown in detail in Fig. 24, where it will be seen that the two valve disks 60a and 60b are of substantially, although not quite, the same size, so that the pressure of the mixture passing therethrough will not offer much resistance either to its closing or subsequent opening.

While I have shown and described by invention as embodied in the forms which I at present consider best adapted to carry out its purposes, it will be understood that it is capable of modifications, and that I do not desire to be limited in the interpretation of the following claims except as may be necessitated by the state of the prior art.

What I claim as my invention, and desire to secure by Letters Patent of the United States, is:

1. In a combustion engine, the combination with a cylinder, of a rotor having contact members co-operating with the inner periphery of the cylinder, an inlet and an outlet to the cylinder, valves controlling said inlet and outlet, means connected to and operated by said rotor for opening and closing said valves thereby alternately admitting through the inlet a compressed mixture to be exploded in the cylinder and plain air to be compressed therein, and for alternately discharging through the outlet the burnt gases and compressed air, means for igniting the compressed mixture after it has passed the inlet, and means for carburetting the air after it is compressed and conveying it to the inlet.

2. A combustion engine as described in claim 1 having a vaporizer into which the compressed air is discharged simultaneously with jets of fuel oil.

3. A combustion engine as described in claim 1 having a vaporizer into which the air compressed by the cylinder is discharged, together with means for simultaneously discharging with said compressed air jets of fuel oil into the vaporizer, a chamber through which the compressed air passes containing a coil through which the fuel oil passes, such coil being heated by the passage through the chamber of the compressed air on its way to the vaporizer.

4. A combustion engine as described in claim 1 having a vaporizer into which the air compressed by the cylinder is discharged, together with means for simultaneously discharging into the vaporizer jets of fuel oil, and connections from the vaporizer to the cylinder inlet in which the resulting mixture is held compressed until drawn into the engine.

5. A combustion engine as described in claim 1 having a vaporizer into which the air compressed by the cylinder is discharged, means for discharging into the vaporizer simultaneously therewith jets of fuel oil, a fuel pump driven by the engine, and a float-controlled trap for said vaporizer to carry any unvaporized oil directly back to the pump.

6. A liquid fuel pump driven by connections having a liquid fuel pump driven by connections from the engine to supply it with fuel, and an adjustable inwardly-opening spring-closed check-valve open to the atmosphere placed in the supply line for the pump to control the relative amounts of air and liquid fuel drawn into the pump depending on how much liquid fuel is permitted to pass the control valve.

7. A combustion engine as described in claim 1 having a vaporizer into which air compressed by the cylinder is discharged, means for simultaneously discharging jets of fuel oil into the vaporizer, and connections from the vaporizer to the engine inlet, wherein the resulting mixture is held compressed as it passes therethrough, and a balanced valve in said connections by which the mixture may be shut off to stop the engine.

8. In a combustion engine, the combination with a cylinder, of a rotor mounted therein, contact members carried by the rotor cooperating with the inner periphery of the cylinder, means to prevent its gaseous contents passing a median line, separate ports to the cylinder on one side of said median line for the admission of combustible mixture and for the admission of air, separate ports to the cylinder on the other side of said median line for the discharge of burnt gases and for the discharge of compressed air, valves controlling said ports, and means for operating said valves in the proper sequence so that after one contact member is driven by an explosive charge and compresses the air admitted before it, the following contact member scavenges the cylinder and draws in a charge of air to be compressed.

9. An engine as described in claim 8 in which the separate ports on one side of the median line have a common entrance to the cylinder with which their valves co-operate and the separate ports on the other side of the median line similarly have a common entrance with which their valves cooperate.

10. A combustion engine as described in claim 8 in which the separate ports on one side of the median line have a common entrance to the cylinder with which their valves cooperate and the separate ports on the other side of the median line similarly have a common entrance with which their valves co-operate in which one of the common entrances has a valve seat with which a tubular valve co-operates, which tubular valve in turn has a valve seat in it with which a second valve within the tubular valve co-operates.

11. A combustion engine as described in claim 8 in which the separate ports on one side of the median line have a common entrance to the cylinder with which their valves cooperate and the separate ports on the other side of the median line similarly have a common entrance with which their valves co-operate in which one of the common entrances has a valve seat with which a tubular valve co-operates, which tubular valve in turn has a valve seat in it with which a second valve within the tubular valve co-operates and in which the entrance valve seat has within it a third valve seat with which a third valve co-operates.

12. In a device of the class described, a rotor having a blade sliding therethrough, wedge-shaped recesses in the rotor, correspondingly wedge-shaped packing strips in the recesses cooperating with the blade near the surface of the rotor and moving radially only relative to the rotor and parallel to and in contact with the blade so that the centrifugal force of the strips tends to wedge them tightly against the surface of the blade.

13. In a device of the class described, the combination with a rotor, of a rotor blade composed of a central member having channels in its edges and ends, with four L-shaped members with abutting ends fitting in the channels, cam members sliding in the central member, said cam members having wedge-shaped outer ends co-operating with the ends of the L-shaped members, and helically-coiled expanding springs in the central member cooperating with the inner ends of the cam members to press them outwardly so as to keep the edges and ends of the rotor blade formed or carried by said L-shaped members held yieldingly in contact with their co-operating surfaces.

14. A rotor and rotor blade as described in claim 13 provided with means by which air is kept circulating through the interior of the rotor and the central member has apertures through it into the recesses containing the springs to admit cooling air to them.

15. A rotor and rotor blade as described in claim 13 in which the legs of the L-shaped members adjacent the periphery of the co-operating cylinder have grooves, and contact members swinging in said grooves, said contact members having their adjacent ends with bevelled surfaces to co-operate with the wedge-shaped ends of the cam members, said beveled surfaces being shaped so as to permit the swinging movement of the contact members.

16. In a device of the class described, the combination with a central shell having threaded apertures in its ends, of end pieces co-operating therewith and having apertures registering with those in the shell, but larger, a rotor journaled in said end pieces and having a blade co-operating with the inner periphery of the shell, screw bolts passed through the larger apertures in said end pieces and threaded into the apertures in the shell, bevel surfaced recesses in the end pieces, wedges co-operating with the recesses and the adjacent surfaces of the shell, and means for moving the wedges, for the purpose described.

17. A device as described in claim 16 in which the wedge-moving means consists of a screw member mounted to rotate in the shell and having its ends provided with right and left hand end screws threaded into the wedges which wedges are mounted so as to prevent their turning with the screw member.

18. In an internal combustion engine, the combination with an explosion chamber, of means therein driven by the explosions alternately to compress a charge of air and to scavenge said chamber, a fuel oil pump driven by said means, a carburetor to which the compressed air and the fuel oil are delivered, means for heating the fuel oil by contact with the compressed air as the latter passes from the explosion chamber to the carburetor, means connected with the carburetor for volatilizing the liquid fuel therein, means for carrying the compressed air charged with the volatilized fuel to the explosion chamber, and means for igniting the mixture in the chamber.

19. An internal combustion engine as described in claim 18 in which the means for heating the fuel oil consists of a coil in the fuel feed pipe leading to the carburetor located in a chamber through which the compressed air passes before it reaches the carburetor.

20. An internal combustion engine as described in claim 18 in which an overflow pipe leads from the carburetor to the inlet of the oil pump.

WILLIAM LISTER.